US011941088B1

(12) United States Patent
Mnih et al.

(10) Patent No.: US 11,941,088 B1
(45) Date of Patent: Mar. 26, 2024

(54) IMAGE PROCESSING OF AN ENVIRONMENT TO SELECT AN ACTION TO BE PERFORMED BY AN AGENT INTERACTING WITH THE ENVIRONMENT

(71) Applicant: DeepMind Technologies Limited, London (GB)

(72) Inventors: Volodymyr Mnih, Toronto (CA); Koray Kavukcuoglu, London (GB)

(73) Assignee: DeepMind Technologies Limited, London (GB)

( * ) Notice: Subject to any disclaimer, the term of this patent is extended or adjusted under 35 U.S.C. 154(b) by 146 days.

(21) Appl. No.: 17/737,544

(22) Filed: May 5, 2022

Related U.S. Application Data

(63) Continuation of application No. 16/927,159, filed on Jul. 13, 2020, now Pat. No. 11,354,548, which is a continuation of application No. 16/250,320, filed on Jan. 17, 2019, now Pat. No. 10,748,041, which is a continuation of application No. 14/731,348, filed on Jun. 4, 2015, now Pat. No. 10,223,617.

(60) Provisional application No. 62/009,097, filed on Jun. 6, 2014.

(51) Int. Cl.
*G06V 10/44* (2022.01)
*G06F 18/2431* (2023.01)
*G06V 20/80* (2022.01)
*G06V 30/194* (2022.01)
*G06V 30/413* (2022.01)

(52) U.S. Cl.
CPC .......... *G06F 18/2431* (2023.01); *G06V 10/44* (2022.01); *G06V 20/80* (2022.01); *G06V 30/194* (2022.01); *G06V 30/413* (2022.01)

(58) Field of Classification Search
CPC . G06T 2207/20084; G06T 2207/20081; G06T 7/74; G06T 7/248; G06V 10/82; G06V 10/40; G06V 20/00; G06V 20/46
See application file for complete search history.

(56) References Cited

U.S. PATENT DOCUMENTS

| | | |
|---|---|---|
| 6,526,167 B1 | 2/2003 | Nunnaoka |
| 9,008,840 B1 | 4/2015 | Ponulak |
| 10,223,617 B1 | 3/2019 | Mnih et al. |
| 10,748,041 B1 | 8/2020 | Mnih et al. |

(Continued)

OTHER PUBLICATIONS

Denil et al., "Learning where to attend with deep architectures for image tracking," Neural Computation, 24(8):2151-2184, 2012.

(Continued)

*Primary Examiner* — Guillermo M Rivera-Martinez
(74) *Attorney, Agent, or Firm* — Fish & Richardson P.C.

(57) ABSTRACT

Methods, systems, and apparatus, including computer programs encoded on computer storage media, for processing images using recurrent attention. One of the methods includes determining a location in the first image; extracting a glimpse from the first image using the location; generating a glimpse representation of the extracted glimpse; processing the glimpse representation using a recurrent neural network to update a current internal state of the recurrent neural network to generate a new internal state; processing the new internal state to select a location in a next image in the image sequence after the first image; and processing the new internal state to select an action from a predetermined set of possible actions.

20 Claims, 3 Drawing Sheets

(56) References Cited

U.S. PATENT DOCUMENTS

| | | |
|---|---|---|
| 2007/0185825 A1 | 8/2007 | Ito |
| 2010/0010948 A1* | 1/2010 | Ito .......................... G06N 3/08 |
| | | 706/20 |
| 2013/0148879 A1* | 6/2013 | Nobuta ................ G06V 10/764 |
| | | 382/157 |
| 2014/0079297 A1 | 3/2014 | Tadayon et al. |
| 2014/0293091 A1 | 10/2014 | Rhoads |
| 2016/0140434 A1* | 5/2016 | Yilmaz .................. G06N 3/044 |
| | | 706/31 |

OTHER PUBLICATIONS

Graves et al., "Sequence Transduction with Recurrent Neural Networks, Nov. 2012," Department of Computer Science, University of Toronto, Canada.

Graves, "Generating sequences with recurrent neural networks," arXiv:1308.0850v5 [cs.NE], Jun. 2014, pp. 1-43.

Larochelle and Hinton, "Learning to combine foveal glimpses with a third-order Boltzmann machine," Advances in Neural Information Processing Systems 23, 2010, pp. 1243-1251.

Mathe et al., Actions in the Eye: Dynamic Gaze Datasets and Learnt Saliency Models for Visual Recognition, Dec. 2013, IEEE.

Mnih et al., Playing Atari with Deep Reinforcement Learning, Dec. 2013, DeepMind Technologies.

Ranzato, "On Learning Where To Look," arXiv:1405.5488v1 [cs.CV], Apr. 2014, pp. 1-14.

* cited by examiner

IMAGE PROCESSING OF AN ENVIRONMENT TO SELECT AN ACTION TO BE PERFORMED BY AN AGENT INTERACTING WITH THE ENVIRONMENT

CROSS-REFERENCE TO RELATED APPLICATION

This application is a continuation application of, and claims priority to, U.S. patent application Ser. No. 16/927,159, filed on Jul. 13, 2020, which is a continuation application of, and claims priority to, U.S. patent application Ser. No. 16/250,320, filed on Jan. 17, 2019, now U.S. Pat. No. 10,748,041, which is a continuation application of, and claims priority to, U.S. patent application Ser. No. 14/731,348, filed on Jun. 4, 2015, now U.S. Pat. No. 10,223,617, which claims priority to U.S. Provisional Application No. 62/009,097, filed on Jun. 6, 2014. The disclosure of the prior applications are considered part of and are incorporated by reference in the disclosure of this application.

BACKGROUND

This specification relates to image processing systems, e.g., systems that identify objects in images.

Image classification systems can identify objects in images, i.e., classify input images as including objects from one or more object categories. Some image classification systems use one or more neural networks to classify an input image.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. An image processing system that processes each image in a sequence of images by extracting a glimpse from the image and processing the glimpse, i.e., without processing the full image, can effectively perform any of a variety of image processing tasks. For example, the image processing system can effectively perform image classification tasks by processing multiple glimpses from the image to be classified. As another example, the image processing system can effectively select actions to be performed by a reinforcement learning agent interacting with a dynamic environment by processing glimpses from images that characterize the state of the environment. Advantageously, the amount of computation necessary to perform the image processing task is not dependent on the number of pixels in an input image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
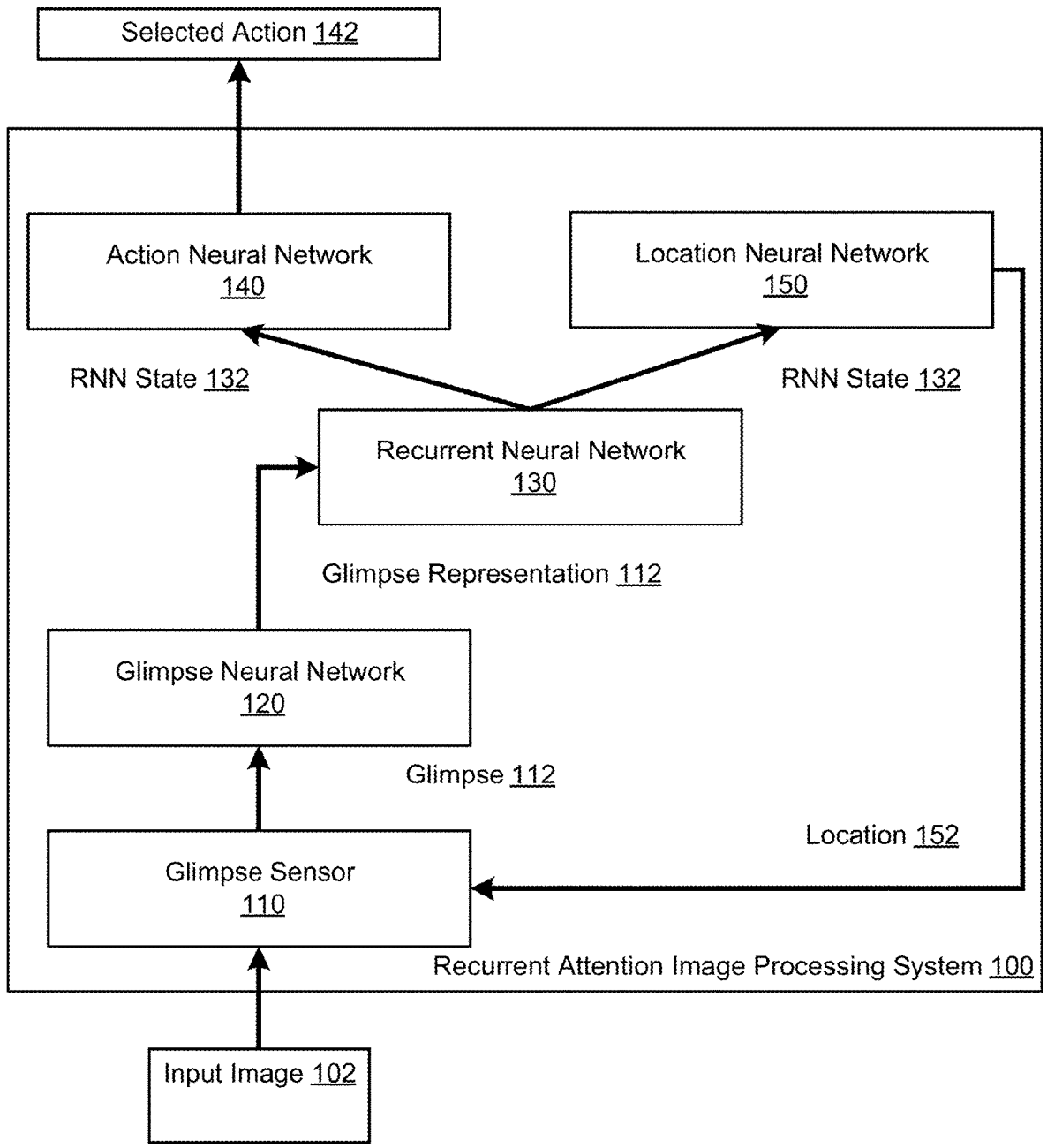
FIG. 1 shows an example recurrent attention image processing system.

FIG. 1 shows an example recurrent attention image processing system 100. The recurrent attention image processing system 100 is an example of a system implemented as computer programs on one or more computers in one or more locations, in which the systems, components, and techniques described below can be implemented.

The recurrent attention image processing system 100 receives a sequence of input images, e.g., a sequence that includes an input image 102, and, for each input image in the sequence, extracts a glimpse from the input image. The recurrent attention image processing system 100 then uses the glimpse to select an action from a predetermined set of actions. For example, the recurrent attention image processing system 100 can extract a glimpse 112 from the input image 102 and use the glimpse 112 to select an action 142.

The recurrent attention image processing system 100 also selects a location in the next input image in the sequence using the glimpse extracted from the current input image in the sequence, e.g., selects a location 152 in the next image in the sequence after the input image 102 using the glimpse 112 extracted from the input image 102. The recurrent attention image processing system 100 then uses the location to extract a glimpse from the next input image in the sequence. Thus, the recurrent attention image processing system 100 processes only a portion of each input image in the sequence to select an action rather than needing to process the entire input image to select the action.

The recurrent attention image processing system 100 can be configured to be used in any of a variety of contexts.

For example, in some implementations, the recurrent image processing system 100 is configured to classify input images as including images of objects from one or more object categories. In these implementations, the actions in the set of actions are object categories, and the sequence of images processed by the recurrent attention image processing system 100 is made up of multiple instances of the same image, i.e., the image to be classified by the recurrent attention image processing system 100.

As another example, in some other implementations, the recurrent image processing system 100 is configured to select actions for a reinforcement learning agent interacting with an environment. For example, the reinforcement learning agent can be one or more software programs in one or more locations that control the operation of a robot that interacts with the environment. For example, the environment interacted with by the robot can be a video game, the images in the sequence can characterize the current state of the video game, e.g., each image can be the current display output of the video game, and the pre-determined set of actions can be game play controls selectable by the robot. As another example, the robot can be an autonomous vehicle, aircraft, or watercraft that navigates through an environment, e.g., a roadway, airspace, or a waterway. In this example, the images in the sequence can characterize the current surroundings of the robot, e.g., each image can be an image of the current surroundings of the robot, and the pre-determined set of actions can be navigational controls for navigating the roadway, airspace, or waterway.

In particular, the recurrent attention image processing system 100 includes a glimpse sensor 110, a glimpse neural network 120, a core neural network 130, an action neural network 140, and a location neural network 150.

For each input image in the sequence of images, the glimpse sensor 110 is configured to extract a glimpse from the input image, e.g., the glimpse 112 from the input image 102, using the location selected for the preceding input image in the sequence. If the current input image is the first input image in the sequence, the glimpse sensor 110 extracts the glimpse using a default location, e.g., the center of the input image, in place of a selected location.

A glimpse extracted from an input image is a retina-like representation of the input image centered at the selected location. In particular, to generate a glimpse from a given input image, the glimpse sensor 110 extracts a predetermined number of patches from the input image. Each patch is a portion of the image, e.g., a rectangular portion, centered at the selected location in the input image. The patches extracted by the glimpse sensor are of varying sizes. In some implementations, the glimpse sensor 110 extracts the smallest-sized patch with one resolution and then decreases the resolution and increases the size for each subsequent patch that the glimpse sensor 110 extracts from the input image. To generate the glimpse from the patches, the glimpse sensor 110 re-scales the patches so that each patch has a predetermined size and then concatenates the re-scaled patches to form the glimpse.

The glimpse neural network 120 is a neural network that is configured to, for each input image, receive the glimpse extracted from the input image by the glimpse sensor 110 and the location in the input image used to extract the glimpse. The glimpse neural network 120 then processes the glimpse and the location to generate an alternative representation of the glimpse, e.g., a glimpse representation 122 of the glimpse 112, in accordance with current values of a set of parameters of the glimpse neural network 120. In some implementations, the glimpse neural network 120 includes one or more neural network layers configured to process the glimpse to generate an initial alternative representation of the glimpse, one or more neural network layers configured to process the location to generate an initial alternative representation of the location, and one or more neural network layers configured to combine the initial alternative representation of the glimpse and the initial alternative representation of the location to generate the glimpse representation.

The core neural network 130 is a recurrent neural network (RNN) that is configured to, for each input image in the sequence, receive the glimpse representation of the glimpse that was extracted from the input and to process the glimpse representation to update the internal state of the core neural network 130 to generate a new internal state. For example, the core neural network 130 can process the glimpse representation 122 of the glimpse 112 to generate a new RNN state 132.

A recurrent neural network is a neural network that receives sequence of inputs and uses each input in the sequence to update an internal state of the neural network in accordance with current values of parameters of the neural network. That is, the new internal state of the recurrent neural network after processing a current input in the sequence is dependent on the current input in the sequence, the current internal state of the recurrent neural network, i.e., the internal state after processing the preceding input in the sequence, and the values of the parameters of the recurrent neural network.

In some implementations, the core neural network 130 is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network. An example LSTM neural network is described in more detail in "Generating sequences with recurrent neural networks," Alex Graves, arXiv:1308.0850 [cs.NE].

In some implementations, the action neural network 140 is a neural network that is configured to, for each input image in the sequence, receive the new RNN state generated by the core neural network 130 from the glimpse representation for the glimpse extracted from the input image and to process the new RNN state to generate a set of action scores that includes a respective action score for each action in the predetermined set of actions in accordance with a set of parameters of the action neural network 140. For example, the action neural network 140 can include a softmax classifier layer that receives the new RNN state or an alternative representation of the new RNN state generated by one or more hidden layers and generates the set of action scores.

Once the action scores have been generated, the recurrent attention image processing system 100 can select the highest-scoring action as the selected action for the input image. In some implementations, e.g., in the image classification context, the recurrent attention image processing system 10 can select multiple highest-scoring actions for the input image.

In some other implementations, the action neural network 140 is a neural network that is configured to, for each input image in the sequence, receive the new RNN state generated by the core neural network 130 from the glimpse representation for the glimpse extracted from the input image and to process the new RNN state to directly select an action from a predetermined set of actions. That is, rather than outputting scores for actions in the set, the action neural network 140 outputs data identifying an action from the set. For example, in the context where the actions are actions to be performed by a robot, the action neural network 140 can output data defining an action to be performed by the robot, e.g., outputting a number specifying torques for a number of motors in the robot.

Further, in some implementations, rather than select an action for every image in the sequence, the recurrent attention image processing system 100 can select an action for only a subset of the images in the sequence.

For example, in implementations where the recurrent attention image processing system 100 is configured to classify input images, the recurrent attention image processing system 100 can, as will be discussed in more detail below with reference to FIG. 3, select an action only for the last image in the sequence.

As another example, in implementations where the recurrent attention image processing system 100 is configured to control a robot, the recurrent attention image processing system 100 can select an action at predetermined intervals, e.g., for every third image in the sequence or for every tenth image in the sequence.

In some implementations where the recurrent attention image processing system 100 selects an action for only a subset of the images in the sequence, the action neural network 140 generates an output for every image, and the recurrent attention image processing system 100 only selects an action based on the output for images that are in the subset. In some other implementations where the recurrent attention image processing system 100 selects an action for only a subset of the images in the sequence, the action neural network 140 is configured to only generate an output for images that are in the subset. For example, the recurrent attention image processing system 100 may provide the new RNN state to the action neural network 140 and cause the action neural network 140 to process the new RNN state only for images that are in the subset and refrain from providing the new RNN state to the action neural network 140 for images that are not in the subset.

The location neural network 150 is a neural network that is configured to, for each input image in the sequence, receive the new RNN state generated by the core neural network 130 from the glimpse representation for the glimpse extracted from the input image and to process the new RNN state to determine a location in the next input image in the sequence in accordance with a set of parameters of the location neural network 150. For example, the location neural network 150 can process the RNN state 132 to determine the location 152.

In some implementations, the location neural network 150 is configured to process the new RNN state and to output a parameter of the distribution of possible locations in the image, e.g., a distribution mean value, in accordance with the parameters of the network. In these implementations, the recurrent attention image processing system 100 can stochastically sample from the distribution that is parameterized by the parameter generated by the location neural network 150. For example, if the location neural network 150 outputs a mean of the distribution, the recurrent attention image processing system 100 can stochastically sample a location from a distribution of locations having a predefined range, e.g., (−1,−1) to (1,1), and having a mean that is the output of the location neural network 150. Optionally, the recurrent attention image processing system 100 refrains from processing the last image in the sequence using the location neural network 150.

Figure 2:
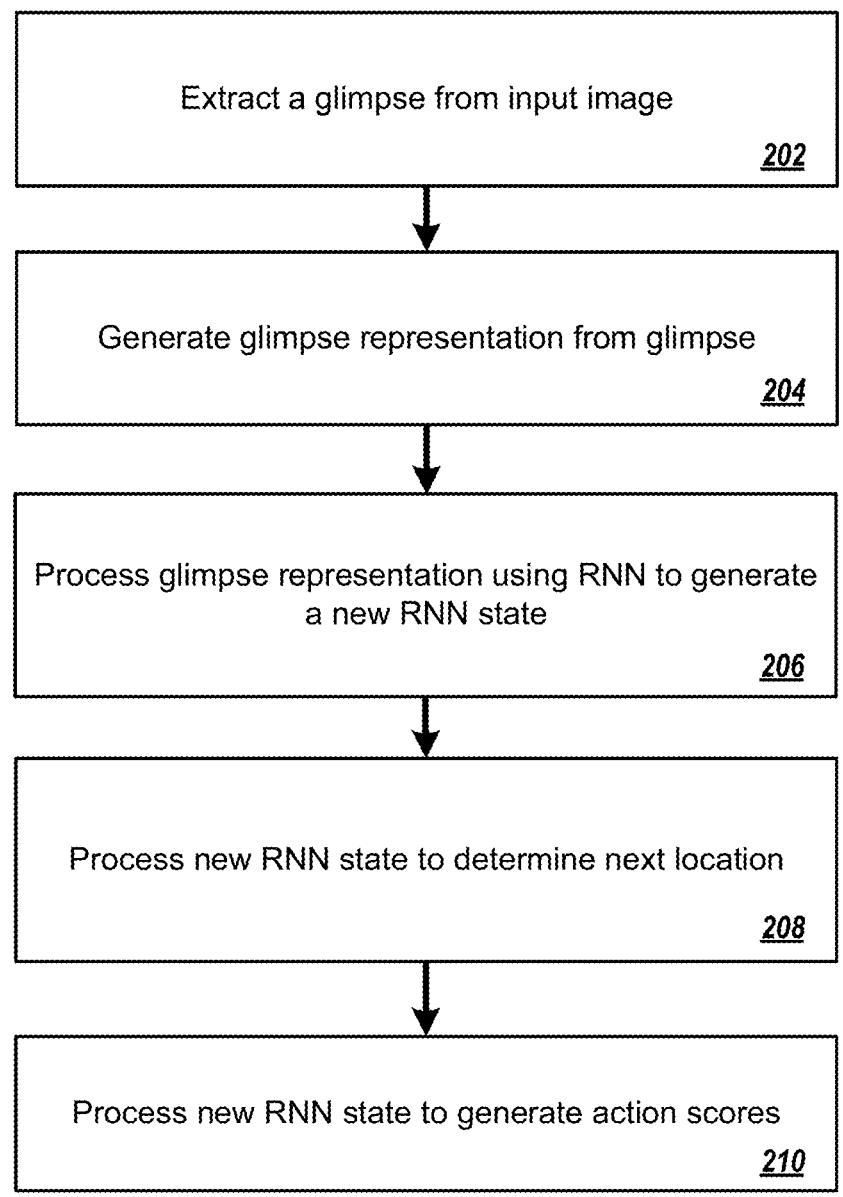
FIG. 2 is a flow diagram of an example process for selecting an action and a location for a current image in a sequence of images

FIG. 2 is a flow diagram of an example process 200 for selecting an action and a location for a current image in a sequence of images. For convenience, the process 200 will be described as being performed by a system of one or more computers located in one or more locations. For example, a recurrent attention image processing system, e.g., the recurrent attention image processing system 100 of FIG. 1, appropriately programmed in accordance with this specification, can perform the process 200.

The system extracts a glimpse from the current image (step 202). In particular, the system extracts multiple patches of various size, with each being centered at a particular location. The particular location is a location that has been selected by processing a patch extracted from the preceding image in the sequence. If the current image is the first image in the sequence, the system selects a default location as the particular location in the current image.

In some implementations, the system extracts the smallest-sized patch with one resolution and then decreases the resolution and increases the size for each subsequent patch that the system extracts from the input image.

To generate the glimpse from the extracted patches, the system re-scales each patch extracted from the current image so that each patch is the same size and then concatenates the re-scaled patches to form the glimpse.

The system generates a glimpse representation, i.e., an alternative representation, of the glimpse extracted from the current image (step 204). In particular, to generate the glimpse representation, the system processes the glimpse and the particular location used to extract the glimpse using a glimpse neural network, e.g., the glimpse neural network 120 of FIG. 1. The glimpse neural network is a neural network that is configured to process the glimpse and the particular location to generate the glimpse representation in accordance with a set of parameters of the glimpse neural network.

The system processes the glimpse representation using a core neural network, e.g., the core neural network 130 of FIG. 1, to generate a new internal state of the core neural network (step 206). The core neural network is a recurrent neural network configured to process the glimpse representation to generate the new internal state (new RNN state) in accordance with the current internal state of the core neural network and a set of parameters of the core neural network.

The system processes the new RNN state using a location neural network to determine a location in the next image in the sequence (step 208), i.e., the location to be used to extract the glimpse from the next image in the sequence. As described above, the location neural network is configured to process the new RNN state to generate a distribution parameter. The system can then stochastically select a location from a distribution of possible locations that is parameterized by the distribution parameter, with each possible location in the distribution corresponding to a respective location in the image.

The system processes the new RNN state using an action neural network to generate a set of action scores (step 210). The set of action scores includes a respective score for each action in the predetermined set of actions. As described above, in some implementations, rather than generating action scores, the action neural network can be configured to directly output data identifying the action to be performed for the image. Additionally, as also described above, in some implementations, the action neural network generates an output for only a subset of the images in the sequence.

The system can train the location neural network, the action neural network, the core neural network, and the glimpse neural network by an end-to-end optimization procedure, i.e., to adjust the values of the parameters of the networks from initial values to trained values, on a set of training image sequences using reinforcement learning training techniques. In particular, during training, for each image in the set of training image sequences, after selecting the action for the glimpse extract from the image, the system can receive or generate a reward that is based on the action that was selected. The system can then train the location neural network, the action neural network, the core neural network, and the glimpse neural network, to, for each training image sequence, maximize the total reward received by the system across all of the images in the sequence.

For example, in the context of image classification, the system can receive a reward of zero for each image other than the last image in the sequence. For the last image in the sequence, the system can receive a reward of one if the selected object category is the correct classification for the training image and a reward of zero if the selected object category is not the correct classification for the training image. The system can then train the location neural network, the action neural network, the core neural network, and the glimpse neural network to maximize the total reward received, i.e., the reward received for the last image in each training image sequence.

As another example, in the context of a robot interacting with a video game, the received reward can be based on whether the selected game play control for each image in the sequence was beneficial in accomplishing a specific goal in the video game.

Figure 3:
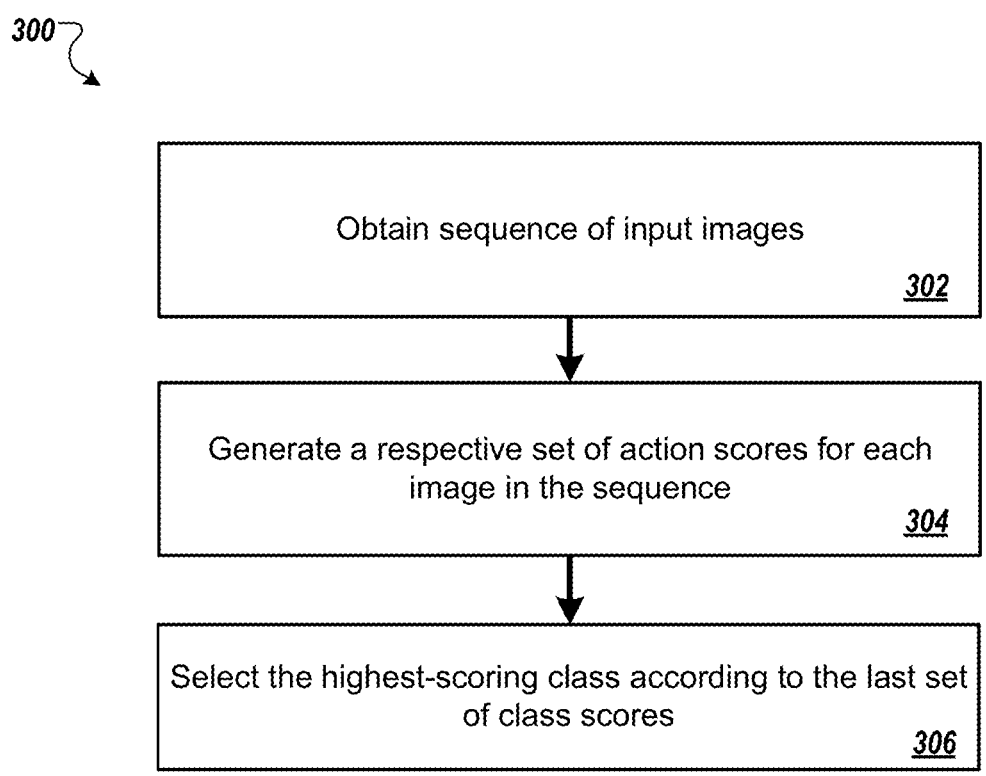
FIG. 3 is a flow diagram of an example process for classifying an image.

FIG. 3 is a flow diagram of an example process 300 for classifying an image. For convenience, the process 300 will be described as being performed by a system of one or more computers located in one or more locations. For example, an image classification system, e.g., the recurrent attention image processing system 100 of FIG. 1, appropriately programmed in accordance with this specification, can perform the process 300.

The system obtains a sequence of input images (step 302). Each image in the sequence is the same input image, i.e., the image to be classified by the system. The number of images in the sequence can be predetermined, e.g., set as a system parameter. In some implementations, the system receives the image sequence. In some other implementations, the system receives the input image and generates a sequence that is made up of the predetermined number of instances of the input image.

The system generates a respective set of action scores for each image in the sequence (step 304). That is, the system extracts a glimpse from each image and generates a set of action scores for the image by processing the extracted glimpse, e.g., as described above with reference to FIG. 2. Because each image in the sequence is the image to be classified, by extracting a glimpse from each image in the sequence, the system extracts multiple glimpses from the image to be classified and generates a set of action scores from each glimpse. As described above, when the system is configured to classify input images, the actions in the set of actions are object categories.

The system classifies the image as including an image of an object from one or more of the object categories using the action scores for the last image in the sequence (step 306). That is, the system selects one or more of the highest scoring object categories according to the action scores for the last image in the sequence and classifies the image as including an object from the one or more selected object categories.

In some implementations, rather than generate the respective set of action scores for each image in the sequence, the system only generates the action scores for the last image in the sequence. That is, the system can, for each image, perform the operations of the glimpse network, the core neural network, and the location network, but refrain from performing the operations of the action network until the last image in the sequence.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing one or more images of an environment to select an action to be performed by an agent interacting with the environment, the method comprising:
   at each iteration of a plurality of iterations:
      receiving a current image for the iteration, wherein the current image is included in the one or more images;
      determining a location in the current image, comprising:
         determining the location based on an output of a location neural network for the current iteration if the current iteration is after a first iteration in the plurality of iterations;
      extracting a glimpse from the current image using the location;
      updating a current internal state of a recurrent neural network using the glimpse extracted from the current image to generate a new internal state, comprising:
         generating a glimpse representation of the extracted glimpse, and
         processing the glimpse representation using the recurrent neural network to update the current internal state of the recurrent neural network to generate a new internal state;
      processing, using the location neural network, the new internal state of the recurrent neural network generated using the glimpse extracted from the image to generate an output of the location neural network for a next iteration in the plurality of iterations; and
   at a last iteration of the plurality of iterations, selecting the action to be performed by the agent, including:
      processing, using an action neural network, the new internal state of the recurrent neural network at the last iteration to generate a respective action score for each action in a set of actions; and
      selecting the action to be performed by the agent using the action scores;
   wherein the location neural network, the recurrent neural network, and the action neural network have been trained by an end-to-end optimization procedure.

2. The method of claim 1, wherein the agent comprises a robot.

3. The method of claim 2, wherein the robot comprises an autonomous vehicle, aircraft, or watercraft.

4. The method of claim 2, wherein the images of the environment characterize current surroundings of the robot.

5. The method of claim 2, wherein the set of actions comprises navigational actions for controlling motion of the robot in the environment.

6. The method of claim 1, wherein each image of the one or more images is a same image.

7. The method of claim 1, wherein selecting the action to be performed by the agent using the action scores comprises:
selecting a highest-scoring action according to the prediction generated using the action neural network.

8. The method of claim 1, wherein extracting the glimpse from the current image comprises:
extracting a plurality of patches from the current image, each patch being centered at the location in the current image; and
combining the patches to generate the glimpse.

9. The method of claim 8, wherein each of the plurality of patches has a distinct size, and wherein each of the plurality of patches has a distinct resolution.

10. The method of claim 9, wherein combining the patches to generate the glimpse comprises:
re-scaling the patches so that each patch has a same size; and
concatenating the re-scaled patches to generate the glimpse.

11. The method of claim 1, wherein generating a glimpse representation of the extracted glimpse comprises:
processing the extracted glimpse and the location in the current image using a glimpse neural network to generate the glimpse representation.

12. The method of claim 11, wherein processing the extracted glimpse and the location in the current image using the glimpse neural network to generate the glimpse representation comprises:
processing the extracted glimpse using one or more first neural network layers to generate an initial representation of the extracted glimpse;
processing the location in the current image using one or more second neural network layers to generate an initial representation of the location in the current image; and
processing the initial representation of the extracted glimpse and the initial representation of the location in the current image using one or more third neural network layers to generate the glimpse representation.

13. The method of claim 1, wherein processing the new internal state to generate an output of the location neural network comprises:
processing the new internal state using the location neural network to generate a distribution parameter; and
stochastically selecting a location from a distribution of possible locations that is parameterized by the distribution parameter.

14. The method of claim 1, wherein the recurrent neural network is a long short term memory (LSTM) neural network.

15. The method of claim 1, wherein the optimization procedure comprises a reinforcement learning optimization procedure.

16. The method of claim 15, wherein the reinforcement learning optimization procedure comprises training the location neural network, the recurrent neural network, and the action neural network to maximize a measure of total reward received as a result of actions performed by the agent in the environment.

17. The method of claim 16, wherein rewards received as a result of actions performed by the agent in the environment are based on progress of the agent toward accomplishing goals in the environment.

18. A system comprising:
one or more computers; and
one or more storage devices communicatively coupled to the one or more computers, wherein the one or more storage devices store instructions that, when executed by the one or more computers, cause the one or more computers to perform operations for processing one or more images of an environment to select an action to be performed by an agent interacting with the environment, the operations comprising:
at each iteration of a plurality of iterations:
receiving a current image for the iteration, wherein the current image is included in the one or more images;
determining a location in the current image, comprising:
determining the location based on an output of a location neural network for the current iteration if the current iteration is after a first iteration in the plurality of iterations;
extracting a glimpse from the current image using the location;
updating a current internal state of a recurrent neural network using the glimpse extracted from the current image to generate a new internal state, comprising:
generating a glimpse representation of the extracted glimpse, and
processing the glimpse representation using the recurrent neural network to update the current internal state of the recurrent neural network to generate a new internal state;
processing, using the location neural network, the new internal state of the recurrent neural network generated using the glimpse extracted from the image to generate an output of the location neural network for a next iteration in the plurality of iterations; and
at a last iteration of the plurality of iterations, selecting the action to be performed by the agent, including:
processing, using an action neural network, the new internal state of the recurrent neural network at the last iteration to generate a respective action score for each action in a set of actions; and
selecting the action to be performed by the agent using the action scores;
wherein the location neural network, the recurrent neural network, and the action neural network have been trained by an end-to-end optimization procedure.

19. One or more non-transitory computer storage media storing instructions that when executed by one or more computers cause the one or more computers to perform operations for processing one or more images of an environment to select an action to be performed by an agent interacting with the environment, the operations comprising:
at each iteration of a plurality of iterations:
receiving a current image for the iteration, wherein the current image is included in the one or more images;
determining a location in the current image, comprising:

determining the location based on an output of a location neural network for the current iteration if the current iteration is after a first iteration in the plurality of iterations;

extracting a glimpse from the current image using the location;

updating a current internal state of a recurrent neural network using the glimpse extracted from the current image to generate a new internal state, comprising:
  generating a glimpse representation of the extracted glimpse, and
  processing the glimpse representation using the recurrent neural network to update the current internal state of the recurrent neural network to generate a new internal state;

processing, using the location neural network, the new internal state of the recurrent neural network generated using the glimpse extracted from the image to generate an output of the location neural network for a next iteration in the plurality of iterations; and at a last iteration of the plurality of iterations, selecting the action to be performed by the agent, including:
  processing, using an action neural network, the new internal state of the recurrent neural network at the last iteration to generate a respective action score for each action in a set of actions; and
  selecting the action to be performed by the agent using the action scores;

wherein the location neural network, the recurrent neural network, and the action neural network have been trained by an end-to-end optimization procedure.

20. The non-transitory computer storage media of claim 19, wherein the agent comprises a robot.

* * * * *